United States Patent Office 2,742,446
Patented Apr. 17, 1956

2,742,446
ADMIXTURES OF TRIFLUOROCHLOROETHYL-ENE POLYMERS AND METHOD FOR MOLDING SAME

Eugene F. Schwarzenbek, Montclair, N. J., assignor to The M. W. Kellogg Company, Jersey City, N. J., a corporation of Delaware No Drawing. Application April 28, 1953,
Serial No. 351,750

10 Claims. (Cl. 260—45.5)

This invention relates to the molding of thermoplastic compositions. In one aspect, the invention relates to the molding of thermoplastic polymeric perhalocarbon compositions. More particularly in this aspect, the invention relates to thermoplastic polymers of trifluorochloroethylene and a method for molding them.

As an accumulative group, perhalocarbon polymers offer wide utility in various industrial applications, serving not only as substitutes for natural rubbers, but in some instances the various individual synthetics are superior to the natural products, e. g., in physical strength, resiliency, and in high chemical stability. In this respect, polymers containing fluorine have been found to be both relatively inert and to possess good physical and chemical characteristics. One of the most useful polymers in this field is polytrifluorochloroethylene. This particular polymer has been developed to a stage in which it is commercially available and has many useful applications by reason of its chemical inertness, and high physical strength and resilience, when in the form of a plastic. Fourth-fifths of the weight of polytrifluorochloroethylene is made up of fluorine and chlorine. The plastic form of polytrifluorochloroethylene is colorless and transparent, and has a high chemical stability with no effect being observed on the plastic polymer after prolonged exposure to hydrofluoric acid, hydrochloric acid and strong caustic solutions, as well as fuming nitric acid, aqua regia and other vigorous oxidizing materials. The plastic form of this polymer exhibits high physical strength, flexibility and resilience, is not affected by water or by humidity, and, in general, is an efficient insulating material. With particular reference to the utility of trifluorochloroethylene plastic polymers, it has been found highly desirable to produce various molded articles from this polymer, employing conventional molding techniques.

Heretofore, the molding of polymeric trifluorochloroethylene plastic, prepared in either granular or powdered form, has been carried out under suitable molding temperature conditions, selected by reference to the standard N. S. T. (no-strength temperature) value for the particular trifluorochloroethylene polymer to be molded. These N. S. T. values for polymeric trifluorochloroethylene plastic vary from about 220° C. to about 350° C. and, depending upon the particular type of molding technique employed (e. g., compression transfer, extrusion, or injection molding) can normally be molded at temperatures between about 415° F. and about 625° F., and at pressures varying between about 500 pounds per square inch and about 40,000 pounds per square inch. In carrying out the molding operation, it has been found, in general, that as the N. S. T. value of the polymer is increased, the molding temperature is, preferably, also increased, if the pressure is to remain the same, in order to insure the best results. For example, a polytrifluorochloroethylene plastic having an N. S. T. value of 240° C. can be satisfactorily molded at a temperature between about 470° F. and about 485° F.; a polymer having an N. S. T. value of 270° C. is satisfactorily molded at a temperature between about 485° F. and about 500° F.; and, similarly, a polymer having an N. S. T. value of 300° C. is satisfactorily molded at a temperature between about 500° F. and about 510° F., within a preferred pressure range, for any of the aforementioned polymers, between about 500 and about 1500 pounds per square inch. The polytrifluorochloroethylene plastic having a relatively low N. S. T. value, such as 240° C., flows easier at the molding temperature and produces a relatively harder finished article, whereas, polymers having a relatively high N. S. T. value, such as 300° C., are more viscous at the molding temperature but produce a more flexible or resilient finished article.

In producing a finished article, employing any of the aforementioned molding techniques, from a thermoplastic polymer of trifluorochloroethylene having an N. S. T. value between about 220° C. and about 350° C., it has been found that in many instances where these molded articles are subjected to structural stresses in performing their function, such stresses often result in the formation of cracks or other similar defects, impairing the efficiency of the article or rendering it entirely unfit for use. This condition is particularly apparent when any of the aforementioned thermoplastic polymers of trifluorochloroethylene are employed to produce finished articles employing injection or extrusion molding techniques, although such deleterious conditions are also found to exist in articles that have been molded by other conventional types of molding operations.

It is, therefore, an object of this invention to provide improved molding compositions, comprising thermoplastic polymers of trifluorochloroethylene, which when molded will produce finished articles that will be free from cracks or other forms of structural deterioration when subjected to stresses or strains in performing their functions.

Another object of the invention is to provide a method for molding the aforementioned compositions, comprising thermoplastic polymers of trifluorochloroethylene, into articles that will be free from cracks or other forms of structural deterioration when subjected to stresses or strains in performing their functions.

Other objects and advantages inherent in the invention will become apparent to those skilled in the art from the following description and disclosure.

Laboratory operations have disclosed that the greatest incidence of cracking and other forms of structural deterioration, occurs in those finished molded articles of polytrifluorochloroethylene plastics, which are the most highly crystalline with a minimum of amorphous regions, and in which the crystallites are most highly oriented perpendicular to the direction of normal stress. It, therefore, becomes important from a standpoint of avoiding such cracking or deterioration of the finished molded article, that the molding operation be carried out in such manner that the molded trifluorochloroethylene plastic, article containing amorphous and crystalline regions, should contain crystallites which are preferably non-oriented, or, if oriented, the orientation is in a direction parallel to the line of stress. Under such conditions, the finished article would be substantially free from the effect of strains and stresses.

With respect to the foregoing, it has also been found desirable to obtain the longest possible polymer chains in the finished article, in order to produce a finished molded article of optimum strength. For this purpose, the high molecular weight trifluorochloroethylene polymers, i. e., polymers having a high N. S. T. value, are accordingly preferred. These high N. S. T. polymer chains are found to crystallize less readily than lower N. S. T. value polymer chains due to the tendency of the long chain polymers to coil, thereby forming amorphous as well as crystalline regions. Thus, it is found that in molding high N. S. T. trifluorochloroethylene polymers, there is less tendency towards orientation and crystallization in the finished article than is present in articles molded from lower N. S. T. trifluorochloroethylene polymers. It would, therefore, appear that wherever possible, the molding operation should be carried out employing as high an N. S. T. trifluorochloroethylene plastic polymer as possible, in order to have non-oriented semi-crystalline long chains present, thereby reducing the effect of stresses and strains set up in the finished molded article. It has been found, however, that in employing such high N. S. T. value trifluorochloroethylene plastic polymers in molding operations, such as injection, compression, extrusion or transfer molding, difficulty is encountered in forcing these relatively high molecular weight polymers through narrow channels or orifices, without subjecting them to sufficiently high temperatures so that the polymer is flowable and cold-flow is minimized. It is difficult, however, to employ such high temperatures without overheating and degrading the polymer, and even if a molding temperature is employed, with a high N. S. T. material, which is near the lower limits at which the material is flowable, the resulting tendency towards cold-flow also results in an increase in the tendency towards undesirable orientation of the long-chain polymers in the finished article.

From the foregoing it would, therefore, appear that if the relatively high N. S. T. material were to be molded in the presence of a suitable plasticizing agent to impart easier flowability to the relatively high N. S. T. polymeric material, the molding operation could be conducted at a relatively lower temperature, at which thermal degradation would not take place, and at the same time (due to minimizing the tendency towards cold-flow) avoid substantial orientation of the polymer. In this respect, however, laboratory experimentation has revealed that even though such plasticizing agents may be employed in admixture with a relatively high N. S. T. trifluorochloroethylene plastic polymer, such orientation is not avoided, and a finished molded article is nevertheless produced, containing strong stresses and strains as a result of orientation.

It might also be assumed, from another approach, that if one were to form a molding composition by admixing a relatively high N. S. T. trifluorochloroethylene plastic polymer with a trifluorochloroethylene plastic polymer of relatively low N. S. T. value (in order to conduct the molding operation at a relatively low temperature, due to the easier flowability of the low N. S. T. material, and thereby avoid thermal degradation of the relatively high N. S. T. value material), the greater tendency of the low N. S. T. polymer, by itself, to orientate, and the added tendency of the high N. S. T. polymer to orientate by reason of increasing its tendency towards cold-flow at the relatively low molding temperature, would result in a finished molded article having stresses and strains set up therein, with a concomitant tendency towards cracking and other forms of structural deterioration.

I have now found, however, much to my surprise that, in accordance with the present invention, when an admixture comprising separate particles of a relatively high N. S. T. trifluorochloroethylene plastic polymer and a relatively low N. S. T. trifluorochloroethylene plastic polymer (prepared, as more fully hereinafter described) is subjected to a molding operation, at temperatures substantially below the temperature of degradation (under the conditions hereinafter described), contrary to expectation, none of the polymers exhibits a tendency towards substantial orientation and the finished molded article is found to be free from the effect of stresses and strains, with no cracking or other forms of structural deterioration taking place.

Specifically, in accordance with the present invention, the molding composition comprises an admixture of separate particles of a thermoplastic polymer of trifluorochloroethylene having an N. S. T. value above 290° C. and a thermoplastic polymer of trifluorochloroethylene having an N. S. T. below 290° C., with an N. S. T. difference between these polymers of at least 20° C. Preferably, the admixture comprises a thermoplastic polymer of trifluorochloroethylene having an N. S. T. above 300° C. and a thermoplastic polymer of trifluorochloroethylene having an N. S. T. below 280° C. In this respect, the relatively high N. S. T. polymer is preferably selected from within the N. S. T. range between about 300° C. and about 350° C., most often employing a polymer whose N. S. T. is above 315° C.; while the relatively low N. S. T. polymer is preferably selected from within the N. S. T. range between about 220° C. and about 280° C., most often employing a polymer whose N. S. T. is above 240° C. or 250° C.

The polymer particles are thoroughly admixed and blended in either a granular or finely divided powdered state (in a particle size which is, preferably, less than 50 mesh), with either the high or low N. S. T. polymer being present in an amount between about 10 and about 90 weight per cent of the total admixture. Preferably, the high or low N. S. T. polymer is present in an amount between about 40 and 60 weight per cent of the total admixture. At this point, it should be noted that while we have referred to the aforementioned admixtures as comprising a relatively high N. S. T. value polymer having an N. S. T. above 290° C. and a relatively low N. S. T. value polymer having an N. S. T. below 290° C. (with an N. S. T. difference of at least 20° C.), it is also within the scope of this invention to have more than one polymer present having an N. S. T. above 290° C., and more than one polymer present having an N. S. T. below 290° C., in the admixture which is to be subjected to the molding operation. In such instances, there should be an N. S. T. difference of at least 20° C. between any polymer in the group in which each polymer has an N. S. T. value above 290° C., and any polymer in the group in which each polymer has an N. S. T. value below 290° C. Similarly, there may also be a plurality of polymers present in the aforementioned group having N. S. T. values above 300° C. and/or a plurality of polymers present in the group having N. S. T. values below 280° C. Furthermore, there may also be a plurality of polymers present in the aforementioned group having N. S. T. values in the range between about 300° C. and about 350° C. and/or a plurality of polymers present in the group having N. S. T. values in the range between about 220° C. and about 280° C. It is also within the scope of this invention to employ various plasticizing agents, if so desired, in combination with the above-mentioned admixtures comprising high and low N. S. T. value trifluorochloroethylene plastic polymers.

The molding of the above-mentioned admixtures comprising a relatively high N. S. T. and a relatively low N. S. T. trifluorochloroethylene plastic polymer (as previously discussed) may be carried out in accordance with conventional injection, compression, extrusion and transfer molding techniques, employing suitable apparatus for the particular type of molding operation desired. Since the novelty of the present invention does not reside in the type of molding apparatus employed, further description thereof is unnecessary. The conditions for carrying out the molding of the aforementioned admixtures, however, are of importance. In general, the molding operation is carried out at a temperature at which the polymers in the admixture are flowable without substantial orientation and below the temperature of substantial degradation, to produce the finished molded plastic article as a product of the process. For this purpose, the molding operation is carried out at a temperature of at least 425° F. (at which temperature the polymers are flowable without substantial orientation) and below the temperature of substantial degradation, viz., 625° F. When the admixture comprises a thermoplastic polymer of trifluorochloroethylene having an N. S. T. value above 300° C. and a thermoplastic polymer of trifluorochloroethylene having an N. S. T. value below 280° C., the molding operation is preferably carried out at a temperature of at least 500° F. and below 550° F. In instances in which the admixture comprises a polymer having an N. S. T. value between about 300° C. and about 350° C., and a polymer having an N. S. T. value between about 220° C. and about 280° C., as previously described, the molding operation is preferably carried out at a temperature of at least 475° F. and below 575° F.

The advantages obtained by molding admixtures of the aforementioned relatively high N. S. T. value and relatively low N. S. T. value trifluorochloroethylene plastic polymers, in producing a finished molded article which does not exhibit cracking or other forms of structural deterioration due to the effect of stresses and strains that are set up within the article, result from the lower molecular weight, or low N. S. T. value, trifluorochloroethylene plastic polymer imparting ease of flowability and lower viscosity to the total polymer mass. At the same time the relatively higher molecular weight, or high N. S. T. value, trifluorochloroethylene plastic polymer provides the long-chains which tend to cement the crystalline regions with the amorphous regions, and thereby imparts strength and toughness to the entire finished molded article.

The following example will serve to illustrate, but is not intended in any way to limit the scope of the invention. This example illustrates the comparative differences in a finished molded article produced, in one instance, from individual standard N. S. T. value grades of trifluorochloroethylene plastic polymers, and in other instances, form an admixture of a relatively high N. S. T. value and a relatively low N. S. T. value trifluorochloroethylene plastic polymer, to produce a finished molded article.

*Example*

Employing conventional injection molding procedure and apparatus, molded articles in the shape of cones were separately prepared from standard 254° C., 270° C. and 318° C. N. S. T. grades of trifluorochloroethylene plastic polymers, respectively, and in another instance, from an admixture of a trifluorochloroethylene plastic polymer having an N. S. T. value of 270° C. and a trifluorochloroethylene plastic polymer having an N. S. T. value of 325° C., in a weight ratio of 1:1. In each instance, the molding operation was conducted at a temperature in the range of between about 485° F. and about 520° F. with the polymer particles being present in a mesh size of 6. The molded cones produced in each instance were aged in an oven for 16 hours at approximately 100° C. The percentage of cracks, or other forms of structural deterioration, occurring in each instance for the various molded articles tested, are shown in the following table:

| N. S. T. Value | Quantity Tested | Percent Exhibiting Cracking or Other Forms of Structural Deterioration |
|---|---|---|
| 254: C | 36 | 97 |
| 270: C | 25 | 60 |
| 318: C | 25 | 32 |
| 270-325: C. (1:1 by weight) | 34 | 0 |

Since certain changes may be made without departing from the scope of the invention, it is intended that all matter contained in the above description shall be interpreted as illustrative and not in a limiting sense.

We claim:

1. A molding composition comprising an admixture of separate particles of a thermoplastic polymer of trifluorochloroethylene having an N. S. T. above 290° C. and a thermoplastic polymer of trifluorochloroethylene having an N. S. T. between about 220° C. and about 290° C., with an N. S. T. difference between said polymers of at least 20° C. and one of said polymers being present in an amount between about 10 and about 90 weight per cent.

2. A molding composition comprising an admixture of separate particles of a thermoplastic polymer of trifluorochloroethylene having an N. S. T. above 300° C. and a thermoplastic polymer of trifluorochloroethylene having an N. S. T. between about 220° C. and about 280° C., and one of said polymers being present in an amount between about 40 and about 60 weight per cent.

3. A molding composition comprising an admixture of separate particles of a thermoplastic polymer of trifluorochloroethylene having an N. S. T. between about 300° C. and about 350° C. and a thermoplastic polymer of trifluorochloroethylene having an N. S. T. between about 220° C. and about 280° C. and one of said polymers being present in an amount between about 10 and about 90 weight per cent.

4. A molding composition comprising an admixture of separate particles of a thermoplastic polymer of trifluorochloroethylene having an N. S. T. between about 300° C. and about 350° C. and a thermoplastic polymer of trifluorochloroethylene having an N. S. T. between about 220° C. and about 280° C. and one of said polymers being present in an amount between about 40 and about 60 weight per cent.

5. A process for molding thermoplastic polymers of trifluorochloroethylene which comprises: forming an admixture comprising a thermoplastic polymer of trifluorochloroethylene having an N. S. T. above 290° C. and a thermoplastic polymer of trifluorochloroethylene having an N. S. T. between about 220° C. and about 290° C., with an N. S. T. difference between said polymers of at least 20° C. and one of said polymers being present in an amount between about 10 and about 90 weight per cent; and molding said admixture at a temperature at which said polymers are flowable without substantial orientation and below the temperature of substantial degradation, to produce a molded plastic article as a product of the process.

6. A process for molding thermoplastic polymers of trifluorochloroethylene which comprises: forming an admixture comprising a thermoplastic polymer of trifluorochloroethylene having an N. S. T. above 300° C. and a thermoplastic polymer of trifluorochloroethylene having an N. S. T. between about 220° C. and about 280° C., and one of said polymers being present in an amount between about 10 and about 90 weight per cent; and molding said admixture at a temperature of at least 500° F. at which said polymers are flowable without substantial orientation and below 550° F., to produce a molded plastic article as a product of the process.

7. A process for molding thermoplastic polymers of trifluorochloroethylene which comprises: forming an admixture comprising a thermoplastic polymer of trifluorochloroethylene having an N. S. T. between about 300° C. and about 350° C. and a thermoplastic polymer of trifluorochloroethylene having an N. S. T. between about 220° C. and about 280° C. and one of said polymers being present in an amount between about 40 and about 60 weight per cent; and molding said admixture at a temperature of at least 475° F. at which said polymers are flowable without substantial orientation and below 575° F., to produce a molded plastic article as a product of the process.

8. The molded product of claim 1.
9. The molded product of claim 2.
10. The molded product of claim 3.

References Cited in the file of this patent

UNITED STATES PATENTS

| 2,572,458 | Eustis | Oct. 23, 1951 |
| 2,617,150 | Rubin | Nov. 11, 1952 |
| 2,618,020 | Busse | Nov. 18, 1952 |

OTHER REFERENCES

Jenckel: Z. Physik. Chem., 182A, pages 367–369 (1938).